(12) United States Patent
Hall

(10) Patent No.: US 7,657,756 B2
(45) Date of Patent: Feb. 2, 2010

(54) SECURE MEMORY CACHING STRUCTURES FOR DATA, INTEGRITY AND VERSION VALUES

(75) Inventor: William E. Hall, Clinton, CT (US)

(73) Assignee: International Business Machines Corporaiton, Armonk, NY (US)

(*) Notice: Subject to any disclaimer, the term of this patent is extended or adjusted under 35 U.S.C. 154(b) by 869 days.

(21) Appl. No.: 10/961,743

(22) Filed: Oct. 8, 2004

(65) Prior Publication Data
US 2006/0080553 A1    Apr. 13, 2006

(51) Int. Cl.
G06F 12/14     (2006.01)
H04L 9/32      (2006.01)
G06F 13/00     (2006.01)

(52) U.S. Cl. .................... 713/189; 711/100
(58) Field of Classification Search ............. 713/189, 713/193; 705/57, 59; 711/100, 145, 113, 711/118, 123, 125, 138, 151, 152
See application file for complete search history.

(56) References Cited

U.S. PATENT DOCUMENTS

| | | | | |
|---|---|---|---|---|
| 6,226,743 | B1* | 5/2001 | Naor et al. ................. | 713/177 |
| 6,460,114 | B1* | 10/2002 | Jeddeloh ..................... | 711/120 |
| 6,889,329 | B1* | 5/2005 | DiGiorgio et al. .............. | 726/9 |
| 6,941,292 | B2* | 9/2005 | Gaur et al. ..................... | 707/2 |
| 6,959,384 | B1* | 10/2005 | Serret-Avila ................ | 713/176 |
| 7,065,215 | B2* | 6/2006 | Shirakawa et al. .......... | 380/277 |
| 7,073,030 | B2* | 7/2006 | Azevedo et al. ............. | 711/136 |
| 7,136,488 | B2* | 11/2006 | Hashimoto et al. .......... | 380/277 |
| 2003/0065933 | A1* | 4/2003 | Hashimoto et al. .......... | 713/194 |
| 2004/0107341 | A1 | 6/2004 | Hall et al. | |
| 2004/0177257 | A1* | 9/2004 | Fujinawa et al. ............ | 713/189 |

OTHER PUBLICATIONS

Charanjit S. Jutla: "Encryption Modes with Almost Free Message Integrity", Advances in Cryptology—Eurocrypt 2001, International Conference on the Theory and Application of Cryptographic Techniques, Innsbruck, Austria, May 2001, Proceedings, pp. 529-544.

* cited by examiner

Primary Examiner—Eleni A Shiferaw
(74) Attorney, Agent, or Firm—Patterson & Sheridan LLP

(57) ABSTRACT

Methods and apparatus that may be utilized to reduce latency associated with encryption based on externally stored security metadata are provided. When encrypted data is accessed for the first time, a cache line containing corresponding metadata used for decryption may be placed in an internal security metadata cache. If that data is accessed again, it may be retrieved without accessing external memory, thus reducing latency. Further, if adjacent data is accessed, the cached line may contain sufficient metadata to decrypt the adjacent data. As a result, a separate operation to access metadata for the adjacent data may be avoided, thus reducing latency.

14 Claims, 13 Drawing Sheets

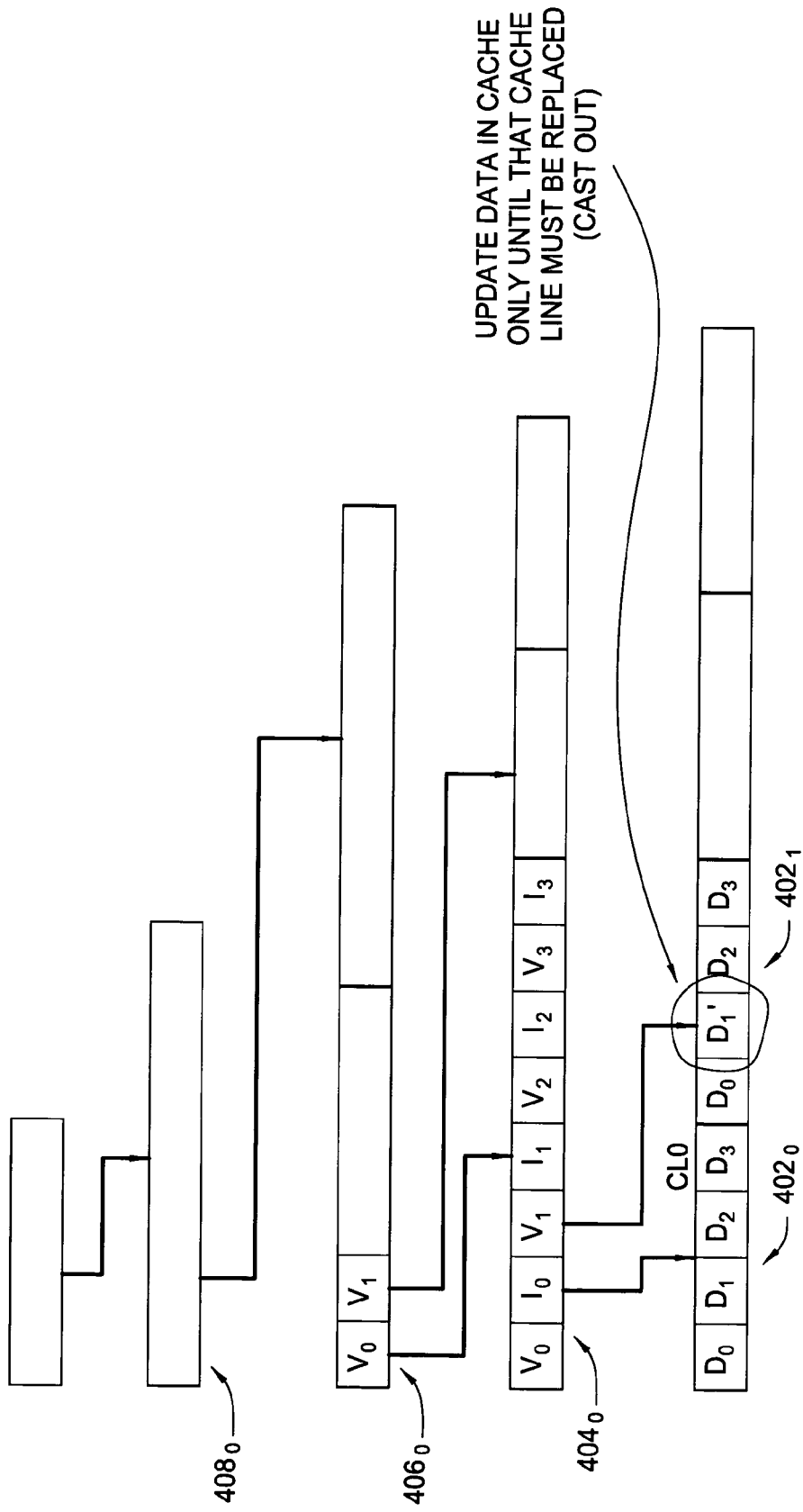

SECURE MEMORY CACHING STRUCTURES FOR DATA, INTEGRITY AND VERSION VALUES

CROSS-REFERENCE TO RELATED APPLICATIONS

This application contains subject matter which is related to the subject matter of the commonly owned, co-pending U.S. Application No. 2004/0107341 A1 entitled "Parallelizable Authentication Tree for Random Access Storage," Ser. No. 10/307,673, filed on Dec. 2, 2002, hereby incorporated herein by reference in its entirety.

BACKGROUND OF THE INVENTION

1. Field of the Invention

The present invention generally relates to data encryption and, more particularly, to methods and apparatus for updating parameters used for encryption, such as version control parameters.

2. Description of the Related Art

A system on a chip (SOC) generally includes one or more integrated processor cores, some type of embedded memory, such as a cache shared between the processors cores, and peripheral interfaces, such as memory control components and external bus interfaces, on a single chip to form a complete (or nearly complete) system. The use of cache memory hierarchies is well established to improve a processor performance by reducing and/or eliminating read access requests to external memory.

As part of an enhanced security feature, some SOCs encrypt some portions of data prior to storing it in external memory. Adding such encryption to an SOC may add valuable benefits, such as preventing a hacker from obtaining instructions of a copyrighted program, such as a video game, or data that may be used to determine such instructions through reverse engineering. When the encrypted data is subsequently retrieved from external memory, it must first be decrypted before it can be used by the processor cores.

Certain types of security information (referred to as metadata) may be employed in an effort to enhance security. For example, an integrity check value may be calculated when encrypted data is written out to external memory and stored. This stored integrity value may be compared against an integrity value calculated when retrieving the encrypted data, with a mismatch indicating the encrypted data has been tampered with. Further, a security version value may be used to affect encryption in some manner. Changing this security version value often (e.g., on every encrypted write to external memory) may prevent unauthorized users (e.g., hackers) from gaining knowledge about security by monitoring data traffic.

In some cases, this security metadata itself may be encrypted and stored externally. Because external memory resources are typically much greater than internal memory resources, storing such metadata externally may allow security to be applied to a much larger memory space than if such metadata was only stored internally. However, in such cases, before encrypted data can be decrypted and validated, the corresponding security metadata used for the encryption must be retrieved and decrypted. As a result, while security metadata may lead to enhanced security, storing this security metadata externally may result in additional latency when retrieving the corresponding encrypted data.

Accordingly, what is needed is a mechanism for reducing latency associated with externally stored security metadata.

SUMMARY OF THE INVENTION

The present invention generally provides structures and techniques for caching security metadata, such as security version and integrity values.

One embodiment provides a method of handling secure data in a secure system, wherein the secure data is passed between a processor and memory external to the processor. The method generally includes maintaining, in an encrypted form in the external memory, a set of metadata used to encrypt and decrypt the secure data, and maintaining, in a decrypted form in a cache internal to the processor, a limited subset of the metadata. Upon receiving a request to access a block of the secure data, the block of secure data may be retrieved from external memory in encrypted form and decrypted using a first portion of metadata maintained in the cache.

Another embodiment provides a method of handling secure data in a secure system, wherein the secure data is passed between a processor and memory external to the processor. The method generally includes maintaining, in external memory in an encrypted form, an authentication tree containing a first level of metadata comprising security version values for use in encrypting blocks of secure data and integrity values for use in authenticating blocks of secure data encrypted using the security version values and at least a second level containing security version values for use in encrypting portions of the first level of metadata, maintaining, in external memory, blocks of secure data encrypted using the version values contained in the first level of metadata, and maintaining, in a decrypted form in a cache internal to the processor, a limited subset of the authentication tree spanning multiple levels.

Another embodiment provides a security-enabled processor for processing secure data stored, in an encrypted form in external memory. The processor generally includes one or more processing cores, one or more processor caches accessible by the one or more processor cores, and a security metadata cache system. The security metadata cache system is generally configured to maintain, in a decrypted form in a metadata cache internal to the processor, a limited portion of a multilevel authentication tree containing metadata used to encrypt the secure data, receive a request to access secure data, retrieve a block of secure data containing the requested data from external memory, and decrypt the block of secure data using a first portion of metadata maintained in the metadata cache.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 8A and 8B illustrate how to update cached data and metadata, according to one embodiment of the present invention.

DETAILED DESCRIPTION OF THE PREFERRED EMBODIMENTS

Embodiments of the present invention may be utilized in systems to reduce latency associated with encryption utilizing externally stored security metadata. When encrypted data is retrieved for the first time, corresponding metadata used for decryption may be placed in an internal security metadata cache. For some embodiments, an entire cache line of metadata may be cached which may include metadata used to encrypt other data near (in address space) previously retrieved encrypted data. As a result, if the near data is requested, the already cached metadata may be used for decryption and validation, reducing the latency associated with retrieving (and decrypting) the metadata. For some embodiments, the metadata cache may be operated in a write-back manner to combine multiple smaller bus write operations into a single modify-encrypt-write operation when a metadata cache line is cast out. As a result, further reductions in resource consumption (e.g., accesses to external memory) may be achieved by avoiding unnecessary intermediate write operations.

As used herein, the term security metadata generally refers to any type of data used during any part of the encryption process. For example, security metadata may include such data as encryption keys, version numbers, and the like, used to encrypt and/or validate data. As used herein, the term secure data refers to data that is to be encrypted when stored external to an encryption-enabled device, such as an SOC, while the term non-secure data refers to data that may be stored externally in non-encrypted form. Data that is non-encrypted (whether secure or non-secure) is referred to herein as plaintext while data that is encrypted is referred to herein as ciphertext. These terms are used for convenience and do not imply the encrypted or non-encrypted data is actually textual data.

In the following, reference is made to embodiments of the invention. It should be understood, however, that the invention is not limited to any specific embodiments described herein. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether a particular advantage is achieved by a given embodiment is not limiting of the invention. Thus, the following aspects, features, embodiments and advantages are merely illustrative and, unless explicitly present, are not considered elements or limitations of the appended claims.

An Exemplary System

Figure 1:
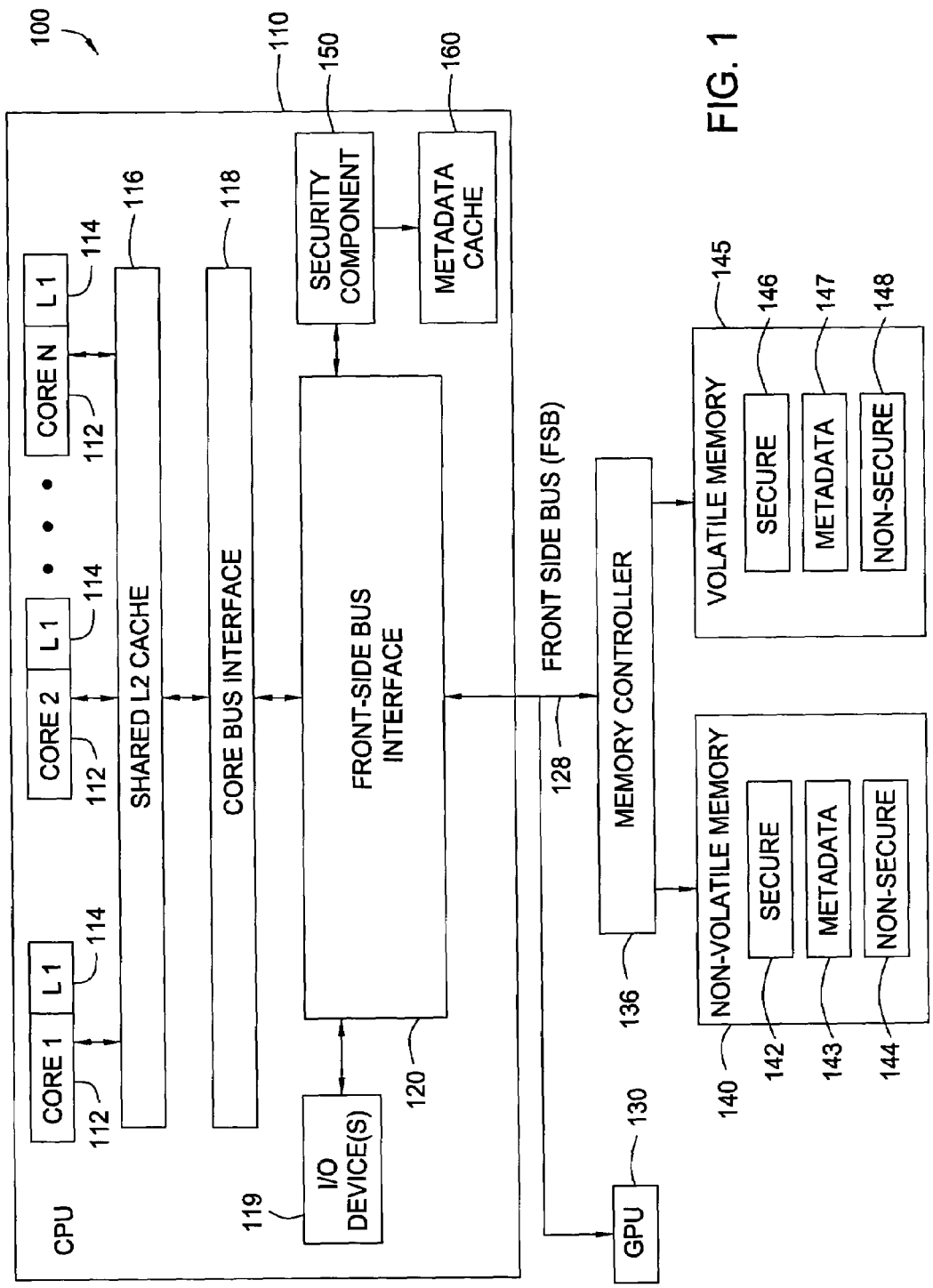
FIG. 1 illustrates an exemplary system including a CPU, in which embodiments of the present invention may be utilized.

Referring now to FIG. 1, an exemplary computer system 100 including a central processing unit (CPU) 110 is illustrated, in which embodiments of the present invention may be utilized. As illustrated, the CPU 110 may include one or more processor cores 112, which may each include any number of different type functional units including, but not limited to arithmetic logic units (ALUs), floating point units (FPUs), and single instruction multiple data (SIMD) units. Examples of CPUs utilizing multiple processor cores include the PowerPC® line of CPUs, available from International Business Machines (IBM) of Armonk, N.Y.

As illustrated, each processor core 112 may have access to its own primary (L1) cache 114, as well as a larger shared secondary (L2) cache 116. In general, copies of data utilized by the processor cores 112 may be stored locally in the L2 cache 116, preventing or reducing the number of relatively slower accesses to external memory (e.g., non-volatile memory 140 and volatile memory 145). Similarly, data utilized often by a processor core 112 may be stored in its L1 cache 114, preventing or reducing the number of relatively slower accesses to the L2 cache 116.

The CPU 110 may communicate with external devices, such as a graphics processing unit (GPU) 130 and a memory controller 136 via a system or frontside bus (FSB) 128. The CPU 110 may include an FSB interface 120 to pass data between the external devices and the processing cores 112 (through the L2 cache) via the FSB 128. The FSB interface 120 may include any suitable components, such as a physical layer (not shown) for implementing the hardware protocol necessary for receiving and sending data over the FSB 128. Such a physical layer may exchange data with an intermediate "link" layer which may format data received from or to be sent to a transaction layer. The transaction layer may exchange data with the processor cores 112 via a core bus interface (CBI) 118.

An FSB interface 132 on the GPU 130 and memory controller 136 may have similar components as the FSB interface 120, configured to exchange data with CPU 110 via the SFB 128. While shown as a separate device in FIG. 1, for some embodiments, the memory controller 136 may be integrated with the GPU 130 or with the CPU 110. For some embodiments, in addition to the processing cores 112, one or more other I/O devices 119 integrated with the CPU 110, such as a direct memory access (DMA) component, may also access memory via the FSB 128. While the following description will be described with reference to access for data by the processor cores 112, the security techniques described herein may also be applied to provide secure access to data processed by any such I/O devices 119.

As illustrated, the memory controller 136 may provide access to various types of external memory devices, such as non-volatile memory 140 and volatile memory 145 (collectively, external memory). Devices in the system 100 (e.g., CPU 110 and GPU 130) may have shared access to external memory in order to minimize memory costs, and to facilitate the transfer of data between functions performed thereby. Typically, non-volatile memory is used for persistent storage, wherein data should-be retained even when power is removed. This memory may contain boot code, operating code, such as the operating system and drivers, and any persistent data structures. Volatile memory, on the other hand is used for session oriented storage, and generally contains application data as well as any corresponding data structures. Since volatile memory is faster than non-volatile memory, it is common to move operating code to volatile memory and execute instructions from there when the integrated device is operational.

Secure Data Processing

As part of an enhanced security feature, the CPU 110 may encrypt some portions of data, referred to herein as secure data, prior to storing it in external memory (such encrypted portions of data are illustratively shown as secure data 142 and 146 in memories 140 and 145, respectively). Accordingly, the CPU 110 may include a security component 150 used to encrypt secure data prior to transmission over the FSB 128 by the FSB interface 120. Upon later retrieval of the encrypted data, the security component 150 may also be used to decrypt the encrypted secure data prior to passing it into the L2 cache 116 for use by one or more of the processor cores 112. For some embodiments, portions of memory may be divided or partitioned into zones of secure data and non-secure data (144 and 148) that may be stored externally without encryption. Further partitioning may also be employed, for example, dividing secure data (142 and 146) into separate zones that require encryption and validation, encryption only, and/or read-only zones.

The security component 150 may employ any suitable encryption algorithms or combination of algorithms for encryption/decryption, including, but not limited to algorithms utilizing whitening keys, hash keys, and/or Advanced Encryption Standard (AES) keys. For some embodiments, one or more of these keys may be generated based on a master key stored in some type of persistent storage (e.g., laser or electrically programmable fuses) located on the CPU 110. For other embodiments, the master key may be used to protect these keys, for example, by encrypting a data structure containing the keys or used to generate the keys. As will be described in greater detail below, encryption may also utilize a security version parameter.

In some cases, information regarding the key(s), as well as the version used for encryption, and/or validation of encrypted data, may be encrypted and stored externally, as a secure block of data, shown as security metadata 143 and 147. As will be described in greater detail below, upon retrieval of secure data, this metadata may be retrieved for validation and/or decryption purposes. In an effort to improve the efficiency and performance of secure data processing, some portions of the metadata and/or secure data may be cached internal to the CPU 110 in a metadata cache 160. Caching metadata and/or secure data may improve performance by allowing access to data/metadata that has already been decrypted, thereby reducing decryption latency associated with subsequent accesses to the same data/metadata, or data/metadata that is nearby in address space (due to locality of reference).

Figure 2A:
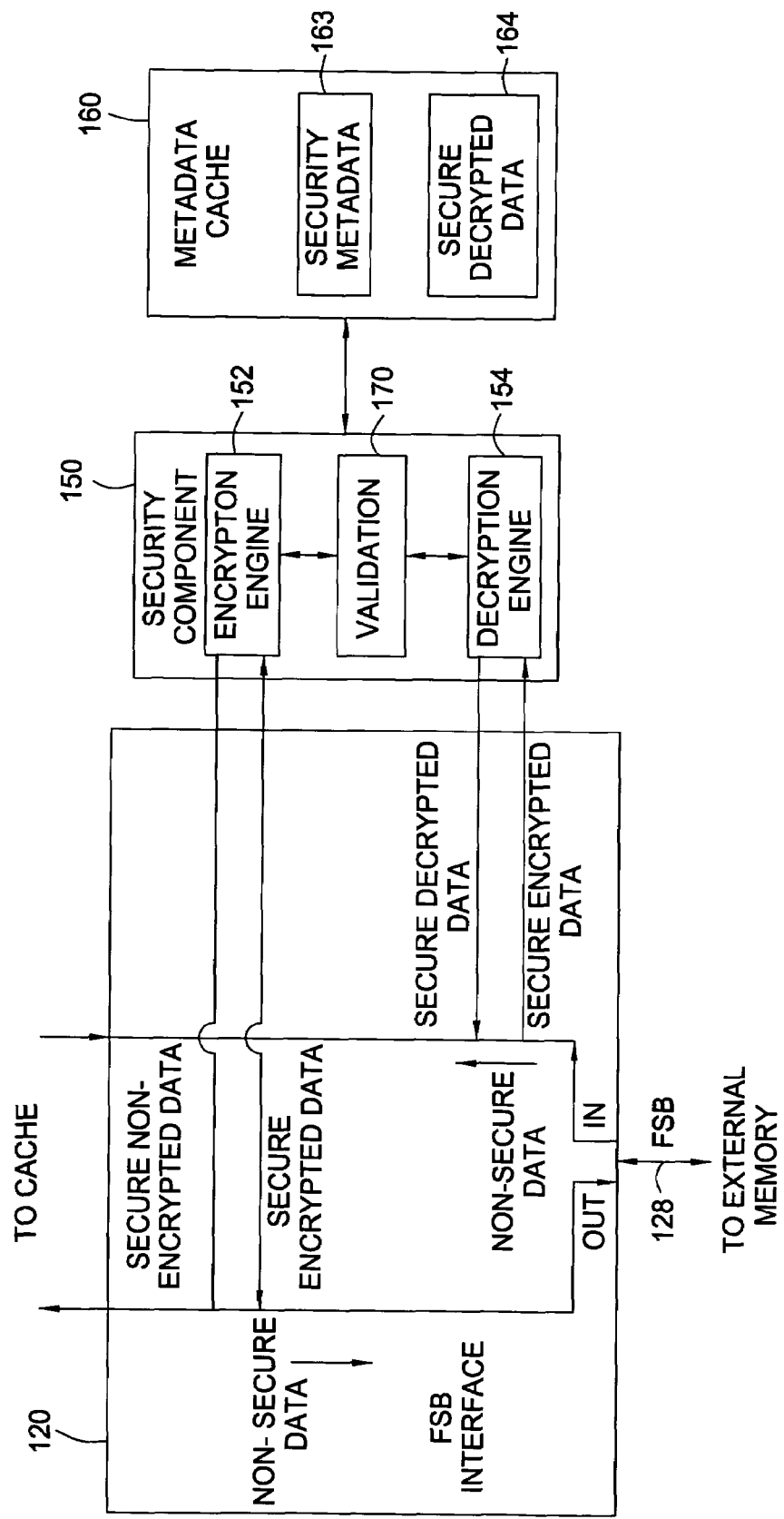
FIGS. 2A-2B are block diagrams illustrating secure data flow through the CPU, according to one embodiment of the present invention.

FIG. 2A is a block diagram that illustrates the flow of both secure and non-secure data through the CPU, in accordance with one embodiment of the present invention, for example, as data is read into the cache from external memory and written out from the cache to external memory. Such data flow may take place, for example, when loading instructions and/or data of a program, such as a game program (e.g., from disk), into the CPU 110 for execution. While not shown, flow control logic configured to identify and route secure and non-secure data in accordance with FIG. 2A may be included in the FSB interface 120. As illustrated, data retrieved from external memory that is not secure is forwarded on to the cache bypassing the decryption engine 154, as no decryption is required.

Note that data received from the processor cache will typically be unencrypted (plaintext) regardless of whether the data is secure or non-secure. If the data is not secure, the plaintext data is written directly out to external memory. Any suitable technique may be utilized to determine if the data is secure. As an example, a specific address range may be reserved for secure data. As another example, secure data may be identified by one or more bit settings in a page table entry, for example, indicating a corresponding cache line is secure. In any case, if the data is secure, the plaintext data is routed to an encryption engine 152 of the security component 150 for encryption. The encryption engine 152 encrypts the secure data and returns the secure data encrypted (as ciphertext).

For some portions of secure data, an integrity check value (ICV) may be calculated (using any suitable checksum or hash algorithm) based on the secure data in plaintext and/or ciphertext form, to allow for subsequent authentication to ensure the encrypted data was not modified (tampered with). This integrity check value may also be encrypted and stored externally, as metadata 143 or 147. As will be described in greater detail below, the security component 150 may communicate with the metadata cache 160 in order to cache security metadata 163 and, for some embodiments, secure decrypted data 164. While some or all of the secure decrypted data 164 may also be cached in a CPU cache 112, there may be advantages to also caching the data in the metadata cache 160.

Figure 2B:
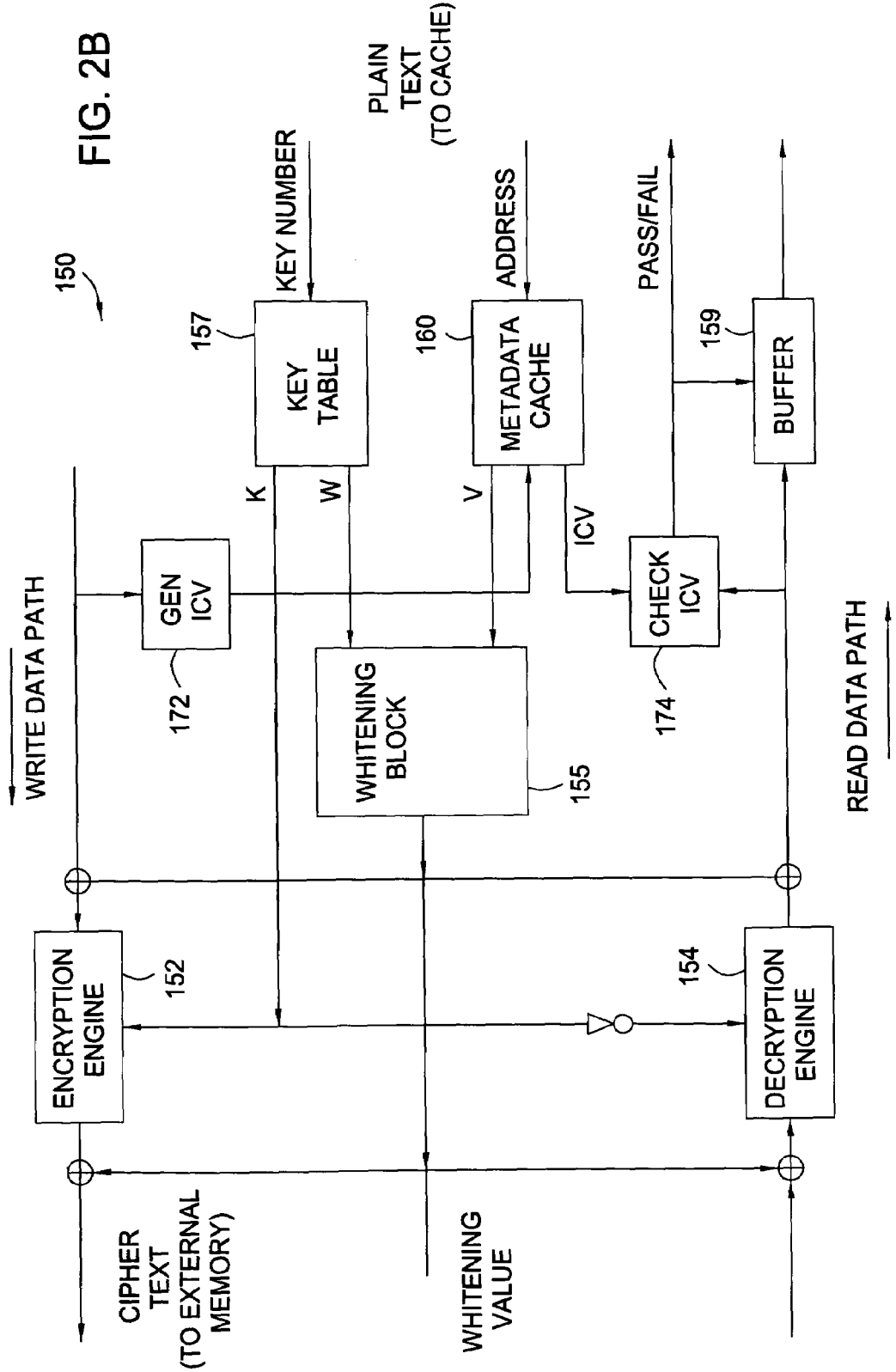

FIG. 2B illustrates how various metadata parameters may be used for decryption and encryption. As illustrated, the encryption engine 152 may encrypt the plaintext data using one of more keys (K) retrieved from a key table 157 using a key index. The encrypted data may also be affected by a whitening value, which may be calculated by a whitening block 155, as a function of a whitening variable provided by the key table 157 and a security version value V. In general, whitening refers to a method of adding a variable to data to be encrypted as a means of removing pattern dependencies and is described in, for example, an article by C. Jutla entitled "Encryption Modes With Almost Free Message Integrity" Proc. Eurocrypt 2001, pp. 529-544, LNCS 2045.

It should be noted that, in general, a change in the security version value results in a different encryption result (e.g., different ciphertext given the same plaintext), thus providing a convenient mechanism to vary the encryption. For some embodiments, every time secure data is written to external memory, a new security version value may be used to affect the encryption, thus making it more difficult for a hacker to determine security information by monitoring data traffic. Utilizing new security version values also renders "recordings" of previous encrypted data at that location unusable, preventing so-called "replay attacks."

As illustrated, the decryption engine 154 may also use the one or more keys K and whitening value to decrypt ciphertext data retrieved from external memory. Information regarding the keys and version data used for encryption (metadata 143, 147) may also be stored externally and retrieved with the secure data and stored in the metadata cache 160. For some embodiments, an integrity check value (ICV) may be calculated based on the secure data in plaintext and/or ciphertext form, by an ICV generation component 172, to allow for subsequent authentication to ensure the encrypted data was not modified (tampered with). This integrity check value may also be encrypted and stored externally, retrieved with the encrypted data, and stored in the metadata cache 160. An ICV may be calculated on retrieved data, and compared against a corresponding ICV from the metadata cache 160, by an ICV check component 174, to detect tampering. If the calculated and stored ICVs match, the ICV check component 174 may generate a PASS signal and pass the data on (from a buffer 159) to the CPU cache. If the calculated and stored ICVs do not match, the ICV check component 174 may generate a FAIL signal, triggering a security exception.

While some embodiments may use encryption/decryption engines implemented in hardware, for some embodiments some or all of the encryption and/or validation operations described herein and shown in the Figures may be performed in software (e.g., running in a secure environment). In such embodiments, software issued access requests for secure data may be routed to/through the security metadata cache 160. Accordingly, the concepts described herein related to secure data processing using a metadata cache may be used to advantage in systems utilizing hardware encryption, software encryption, or any combination thereof.

Security Authentication Tree

As previously described, security metadata used during the encryption process, such as version and integrity values may be encrypted and stored in external memory. In some cases, in an effort to facilitate access and ensure the validity (i.e., authenticate) of the secure data, a data structure, commonly referred to as an authentication tree, may be utilized. The authentication tree may be used to check to see if portions of the secure data have been deliberately or accidentally modified, using data at one level of the tree (e.g., ICVs) to validate the contents of another portion (secure data). One advantage to such authentication trees is that incremental updates may be made to underlying data (with remaining portions unchanged), requiring changes to only corresponding portions of the tree. An example of such an authentication tree is described in the commonly-owned, co-pending application, entitled "Parallelizable Authentication Tree for Random Access Storage," Ser. No. 10/307,673, filed on Dec. 2, 2002.

Figure 3:
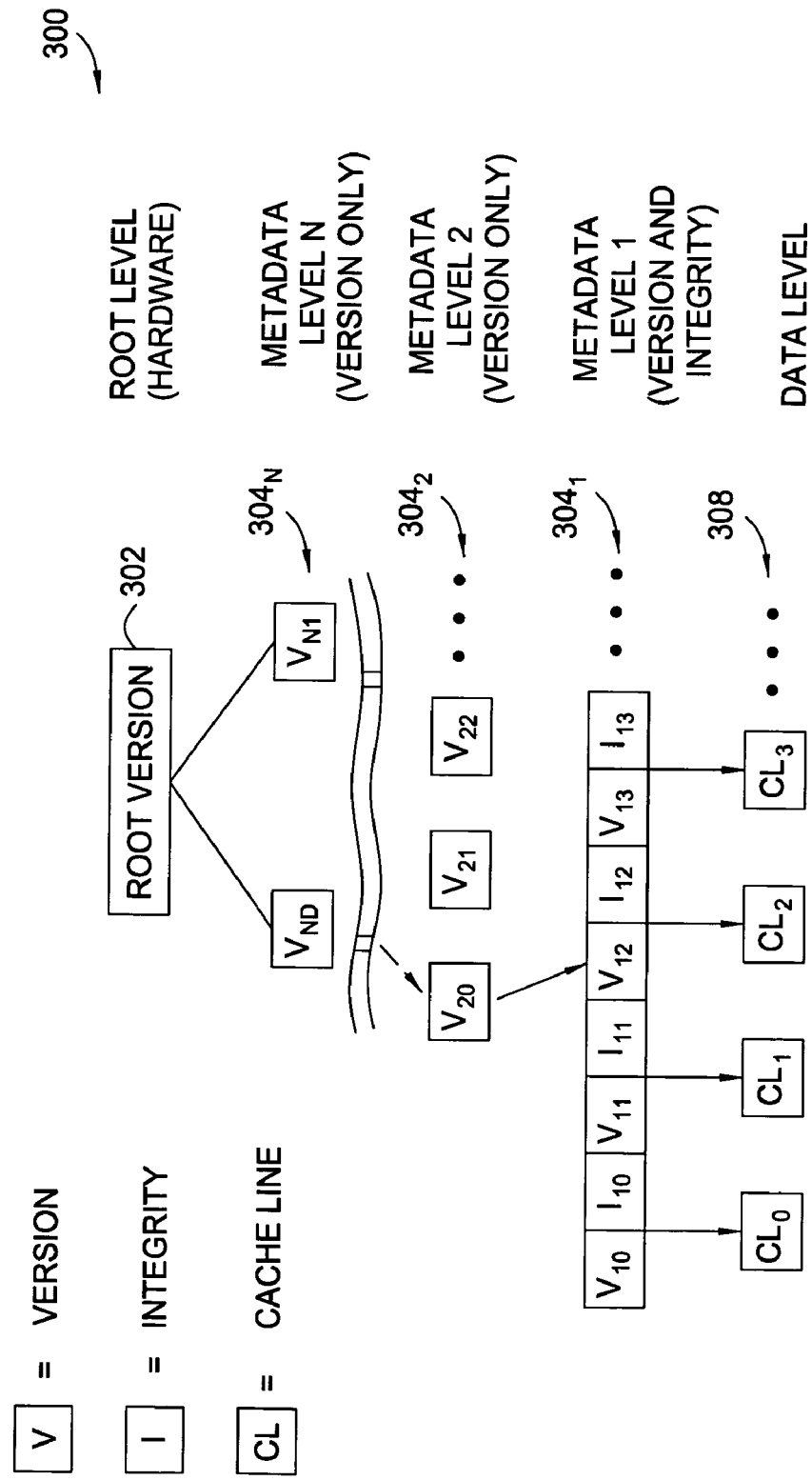
FIG. 3 illustrates an exemplary authentication tree, according to one embodiment of the present invention.

FIG. 3 illustrates an exemplary authentication tree 300, in accordance with embodiments of the present invention. A bottom level 308 of the tree 300 contains secure data (cache lines CL0, CL1, . . . ). The next level of the tree $304_1$, labeled metadata level 1, contains security version values ($V_0$, $V_1$, . . . ) used to encrypt the data at the bottom level 308. If integrity is enabled, for use in validating the data at the bottom level 308, the first metadata data level $304_1$ may also include integrity check values ($I_0$, $I_1$, . . . ) calculated for corresponding blocks of secure data. For example, a first block of secure data (e.g., a block in cache line CL0) may have been encrypted using a first version value $V_0$ and a first integrity value $I_0$ may have been calculated on the secure data block. The size of the encrypted data blocks may vary and may be selected based on a number of factors, such as the encryption algorithm used, desired encryption strength, size of the version values, and the like. For example, for some embodiments utilizing 128-bit encryption, 8-byte version values may be used to encrypt 128-byte cache line blocks of data and 8-byte integrity values may be calculated thereon (for a total of 16-bytes of metadata per level 1 cache line data block).

The (version and integrity) values at the first metadata level $304_1$ may be encrypted using version values stored in a second metadata level $304_2$. Integrity values may be omitted from such higher levels, as any tampering with the metadata will result in invalid integrity comparisons at the data level. On the other hand, if it is important to detect tampering in a specific metadata level, higher level integrity values may also be used. Again, assuming 128-byte blocks of level 1 metadata may be encrypted using 8-byte version values, a single 128-byte level 2 entry may include 16 8-byte version values, which may each be used to encrypt a 128-byte block of level 1 metadata (8×16), which is sufficient to encrypt and validate 8 128-byte data blocks. Thus, the storage efficiency of the authentication tree becomes apparent. Additional metadata levels may also be used, up to a level N $304_N$, with version values at each level being used to encrypt metadata at a lower level. Metadata at the highest level $304_N$ may be encrypted using a root version value 302 (e.g., stored in a hardware register).

The authentication tree 300 may thus be used to retrieve and authenticate data as follows. In order to decrypt and validate the encrypted data blocks, at the data level 308, the corresponding metadata at the first metadata level $304_1$ must be retrieved and decrypted. However, in order to decrypt the metadata at the first metadata level $304_1$, the corresponding metadata at the second level of metadata $304_2$ must be retrieved and decrypted. This process may be repeated until the highest level of metadata $304_2$ is retrieved and decrypted using the root version.

Recall that, for some embodiments, to provide enhanced security, whenever data (or metadata) is modified and stored back to external memory, a new version is used for encryption. Thus, when writing modified secure data back to external memory, data at higher levels of the tree may also be modified and encrypted accordingly using the new security version values. Thus, while the authentication tree may lead to efficient storage and allow incremental updates, substantial latency may be incurred when modifying, as well as reading, encrypted data and corresponding levels of metadata.

Security Metadata Cache

For some embodiments, however, the overall latency associated with reading and/or writing data and/or metadata from an authentication tree stored in external memory may be significantly reduced by caching portions of the tree in the security metadata cache 160. For example, when encrypted data is retrieved for the first time, corresponding metadata used for decryption may be placed in the metadata cache 160. While the decrypted data may also be brought into the CPU cache 112, in some cases, the decrypted data may also be placed in the metadata cache 160. This may be advantageous, for example, if the metadata cache line size is greater than the CPU cache line size (e.g., 128 byte versus 32 byte), allowing for increased encryption/integrity block sizes (e.g., with multiple CPU cache lines retrieved and decrypted with each read). In other words, while the CPU may only utilize and request 32 byte blocks, if data is encrypted in 128 byte blocks, a full 128-bytes may be retrieved and cached. As a result, data needed for subsequent CPU reads (within the same 128 bytes) may be found in the metadata cache 160, already decrypted.

Figure 4:
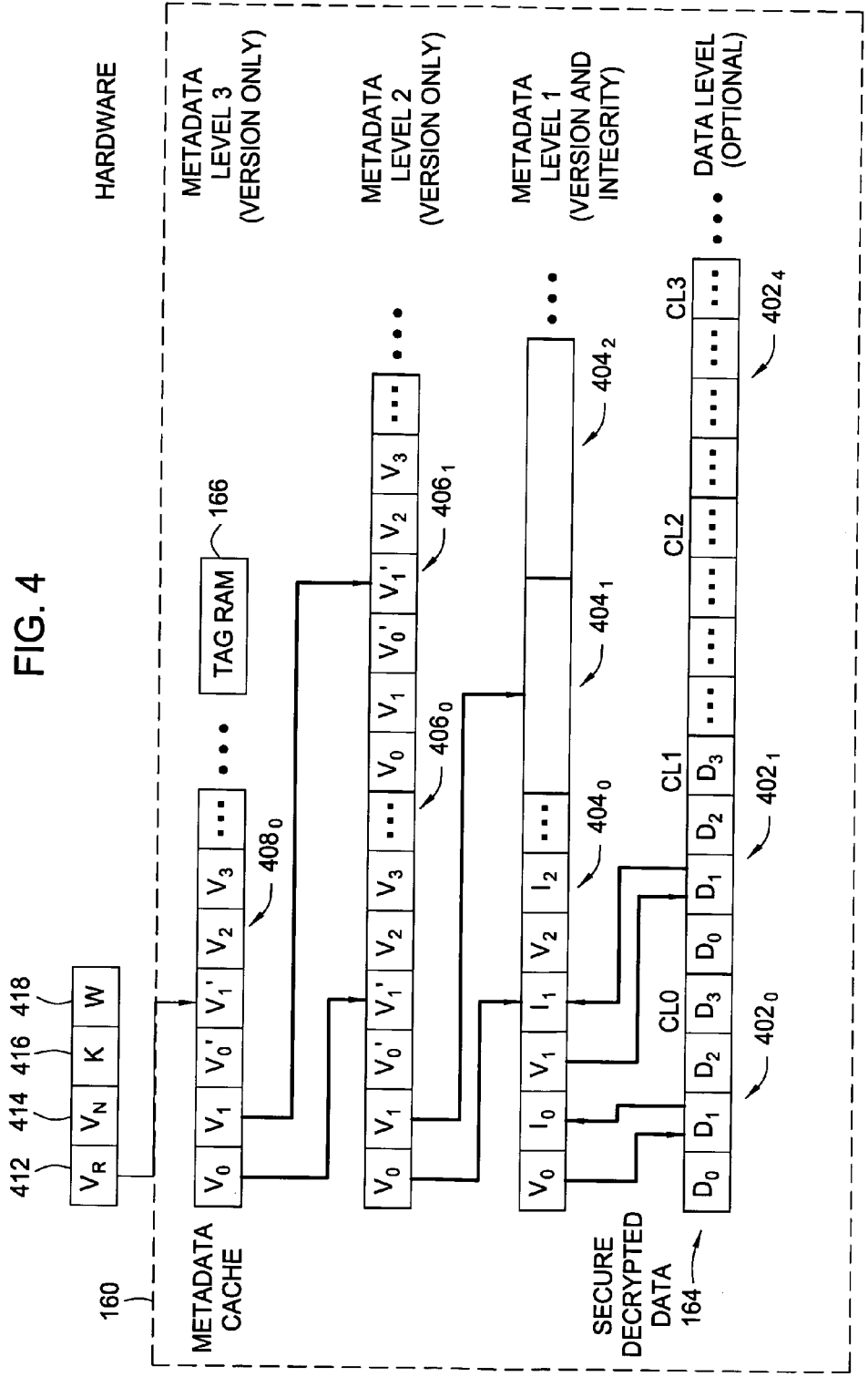
FIG. 4 illustrates an exemplary data structure for caching portions of the exemplary authentication tree of FIG. 3, according to one embodiment of the present invention.

FIG. 4 illustrates how portions of an exemplary authentication tree may be stored in metadata cache 160, according to one embodiment of the present invention. As illustrated, cache lines 404 version and integrity values corresponding to data cache lines 402 of secure data 164 may be stored in a first metadata level. As described above, for some embodiments, the data cache lines 402 may be stored in the metadata cache 160. Each data cache line 402 (e.g. 128 bytes) may include several CPU-sized (e.g., 32 bytes) cache lines, illustratively labeled D0-D3.

In any case, each metadata cache line 404 may contain version and integrity values to decrypt several data cache lines 402. It should be noted, however, that only some of the data cache lines 402 "covered" by a metadata cache line 404 may reside in the cache 160 (data cache lines 402 are typically only retrieved when needed). Illustratively, data cache lines $402_0$ and $402_1$ with corresponding version and integrity values $V_0/I_0$ and $V_1/I_1$ are shown, while no data cache lines corresponding to version and integrity values $V_2/I_2$ are cached. However, when one of the data cache lines 402 covered by metadata in the metadata cache line 404 is requested, because the metadata is already cached, the requested data is simply retrieved and decrypted, without the latency associated with retrieving (and decrypting) the corresponding metadata.

For example, again assuming 128-byte cache lines for data/metadata and 8-byte version/integrity values, a level 1 metadata cache line may contain 8 version and integrity pairs, sufficient to cover 1 k (8×128) of secure data. Subsequent levels of metadata may contain cache lines 406 and 408 of version data, each used to encrypt/decrypt lower levels of metadata. Assuming version only is used at these higher layers, a single 128-byte cache line may contain 16 8-byte versions, each covering a 128-byte cache line at a lower level. Accordingly, a single cache line in the second metadata level 406 may contain enough version values to encrypt 16 level 1 metadata cache lines, for a total coverage of 128 data cache lines (16 k bytes of data). Similarly, a single cache line in the third metadata level 408 may cover 16 level 2 cache lines, for a total coverage of 256 k bytes of data. A root version, stored in hardware may be used to encrypt/decrypt the highest level of metadata. Due to locality of reference, however, it is likely that the higher levels of the tree will be accessed relatively infrequently, with the lower levels being accessed more frequently.

For some embodiments, two copies of version values may be kept in external memory: both a clear (unencrypted) copy and an encrypted copy. Keeping the clear copy may allow reductions in decryption pipeline latency by allowing decryption operations (for lower levels of data/metadata which depend on the version value) to begin quickly (as soon as the clear copy of the version is retrieved), without waiting for decryption of higher level metadata to be completed. The encrypted copy of the version (after it is decrypted) may then be compared against the clear copy of the version to validate the data. If a mismatch is detected, the cache line containing the version value is not validated and any decrypted values that may have been obtained using the clear copy may be disregarded. Keeping the encrypted copy of a version in external memory has the desirable result that the encrypted copy of the version value is affected by changes to higher level versions used for the encryption. While keeping two copies of the version value may result in additional external memory consumption (e.g., while a 128 byte cache line will hold 16 8 byte clear version values, 256 bytes of external memory will be required to hold 16 pairs of 8 byte clear and encrypted version values), the potential reductions in decryption latency that may be achieved using the clear version values, particularly for high performance decryption engines with multiple decryption stages, may more than outweigh the cost (e.g., external memory is typically relatively inexpensive and this additional storage is only required for higher levels of the tree).

In any case, the cache 160 may be allocated among the various levels in any suitable manner. For example, for some embodiments, approximately 50% of the metadata cache 160 may be allocated to data, 25% to the first metadata level, 12.5% to the second metadata level, etc. At some point, each higher level may get an equal portion, reserving some remaining portion of sufficient size to store tag RAM 166. In general, the tag RAM identifies which data from external memory is currently stored in each cache line. In general, the values stored in the tag RAM 166 determine whether a cache lookup results in a hit or a miss.

The tag RAM 166 may also contain additional information related to encryption not discernable by the physical address, such as an index specifying a zone in external memory indicating what type of encryption is utilized, such as encryption with integrity, read-only (no version change), encryption only (no integrity), and/or a key set. For read-only secure data, the only type of metadata cached may be one level of integrity values (as only one version may be used: since the data is not changed, updated versions may not be needed for write out). On the other hand, for encryption only, the first metadata level may contain version values only, but no integrity. For some embodiments, an authentication structure for more than one such zone may be supported in the same cache 160 (with each zone maintaining its own root version independently). To facilitate discussion, however, the following examples will describe accessing (reading and writing) secure data with integrity.

Secure Data Access Using the Metadata Cache

Figure 5:
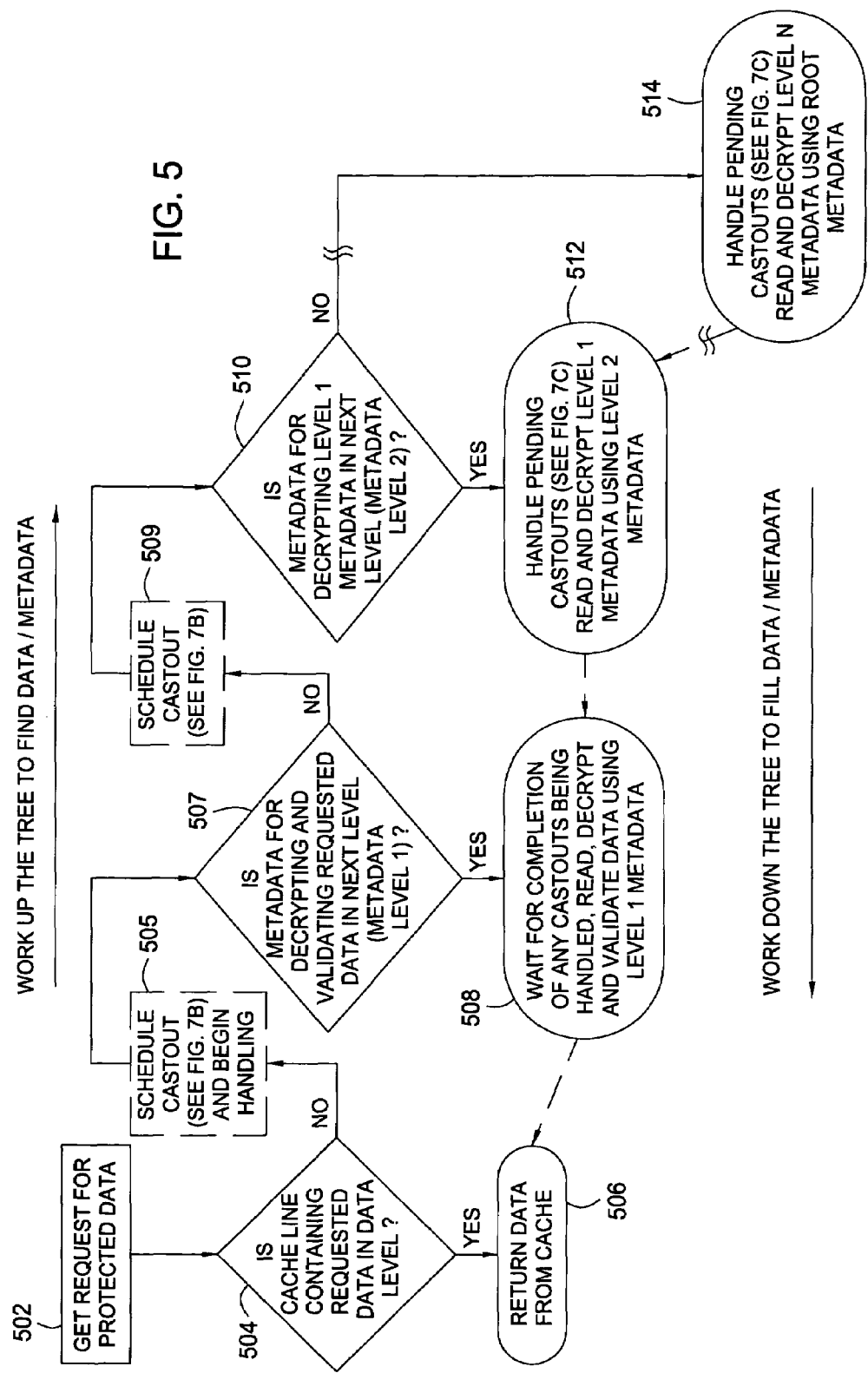
FIG. 5 is a flow diagram of exemplary operations for processing read requests utilizing the data structure of FIG. 4, according to one embodiment of the present invention.

FIG. 5 is a flow diagram of exemplary operations 500 for processing read requests utilizing the cached data structure shown in FIG. 4. As illustrated, the operations 500 essentially involve working up the cached tree structure until sufficient metadata covering (i.e., necessary for decrypting) the requested data is found. Once the metadata is found, the operations involve working back down the tree from the level in which the metadata was found back to the data level, using the metadata at each higher level to decrypt the data/metadata at the next lower level. While shown as sequential steps, it should be understood that many of the operations described may actually be performed in a parallel (pipelined) manner. For example, a read of an encrypted block of data/metadata may be initiated before the metadata required to decrypt that data/metadata is actually available (e.g., while that metadata is being decrypted). As a result, by the time the metadata is available, the data/metadata to be decrypted may have already be read in.

The operations begin, at step 502, by receiving a request for protected (secure) data. At step 504, a determination is made as to whether a cache line containing the data is contained in the data level of the metadata cache 160 (and/or CPU cache). For example, the data may have been previously requested or may be contained in the same cache line as previously requested data. As previously described, this determination may be made by examining entries in tag RAM 166. If the requested data is cached, the data is simply returned, at step 506.

For some embodiments, an additional check may be performed to determine if an entity requesting the data has corresponding access rights authorizing that entity to access the decrypted data. In other words, for some embodiments requesting entities may only have access to encrypted data and, without checking such access, decrypted data may be returned to a user that is only authorized to access encrypted data or only plaintext data. For example, in some cases, a direct memory access (DMA) component may copy data directly from one portion of memory to another. In such cases, the DMA unit may only be authorized to access the encrypted data. For some embodiments, such access control may be handled by maintaining different security zones, as described above. Before returning data to a requesting entity, a check may be performed to see if that entity is authorized to access data from the corresponding zone.

In any case, if requested data is not cached, the data will need to be retrieved from memory. In order to make room in the cache, a castout of a cache line at the data level may be scheduled (and handling of the castout may begin), at step 505. Castout scheduling and handling are described in detail below, with reference to FIGS. 7B and 7C, respectively. For some embodiments, castouts may be scheduled while traversing up the tree looking for valid metadata to be used in decrypting data at lower levels, while scheduled castouts may be processed (handled) while traversing down the tree. However, at the data level, processing of the castout may be initiated sooner, in order to calculate the integrity check value that will be placed in the level 1 metadata prior to casting out the level 1 metadata. As higher metadata levels of the cache may not contain integrity check values, castouts at all levels above the data level may be handled as the tree is traverse downward.

At step 507, a determination as to whether metadata necessary for decrypting the requested data is in the next higher level (e.g., metadata level 1). This determination may be made by first calculating, from the physical address of the requested data, where in memory the corresponding level 1 metadata should reside. Once that location is determined, the tag RAM entries for the first metadata level may be examined to determine if the necessary metadata is cached. If the level 1 metadata is cached, the requested data is read, decrypted, and validated using the cached metadata, at step 508. As illustrated, it may be necessary to wait for the completion of any pending castouts occurring at this level prior to.

If the metadata necessary to decrypt and validate the requested data is not found in the first metadata level (level 1), the next higher metadata level (level 2) is checked for metadata necessary to decrypt the level 1 metadata, at step 510. To make room for the metadata to be retrieved, a castout at the first metadata level may be scheduled, at step 509. If the necessary metadata is found, that level 2 metadata is used to read and decrypt the level 1 metadata, at step 512. Similar operations may be performed, working up (climbing) the tree until necessary metadata is found at higher levels of the cache. If the top level is reached and necessary metadata is still not found, the root metadata (version) may be used to decrypt the top level metadata, at step 514. Once decrypted, the top level metadata may be used to decrypt the next lower level, and similar operations may be used to decrypt each subsequent level of the tree downward until the data level is reached and the requested data is decrypted, at step 508, and the requested data is returned, at step 506.

Figure 6A:
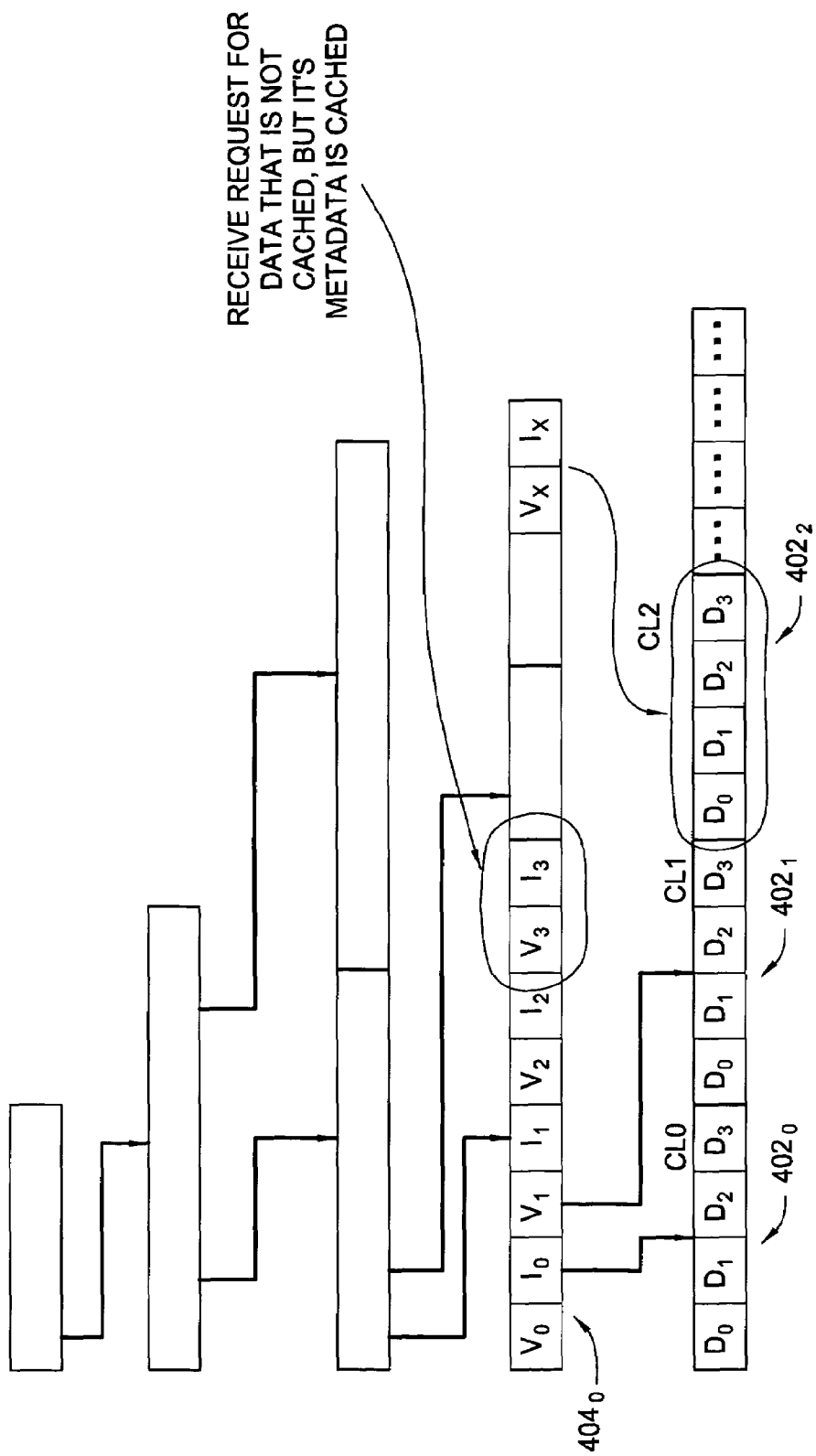
FIGS. 6A and 6B illustrate how cached metadata is used to retrieve encrypted data, according to one embodiment of the present invention.
Figure 6B:
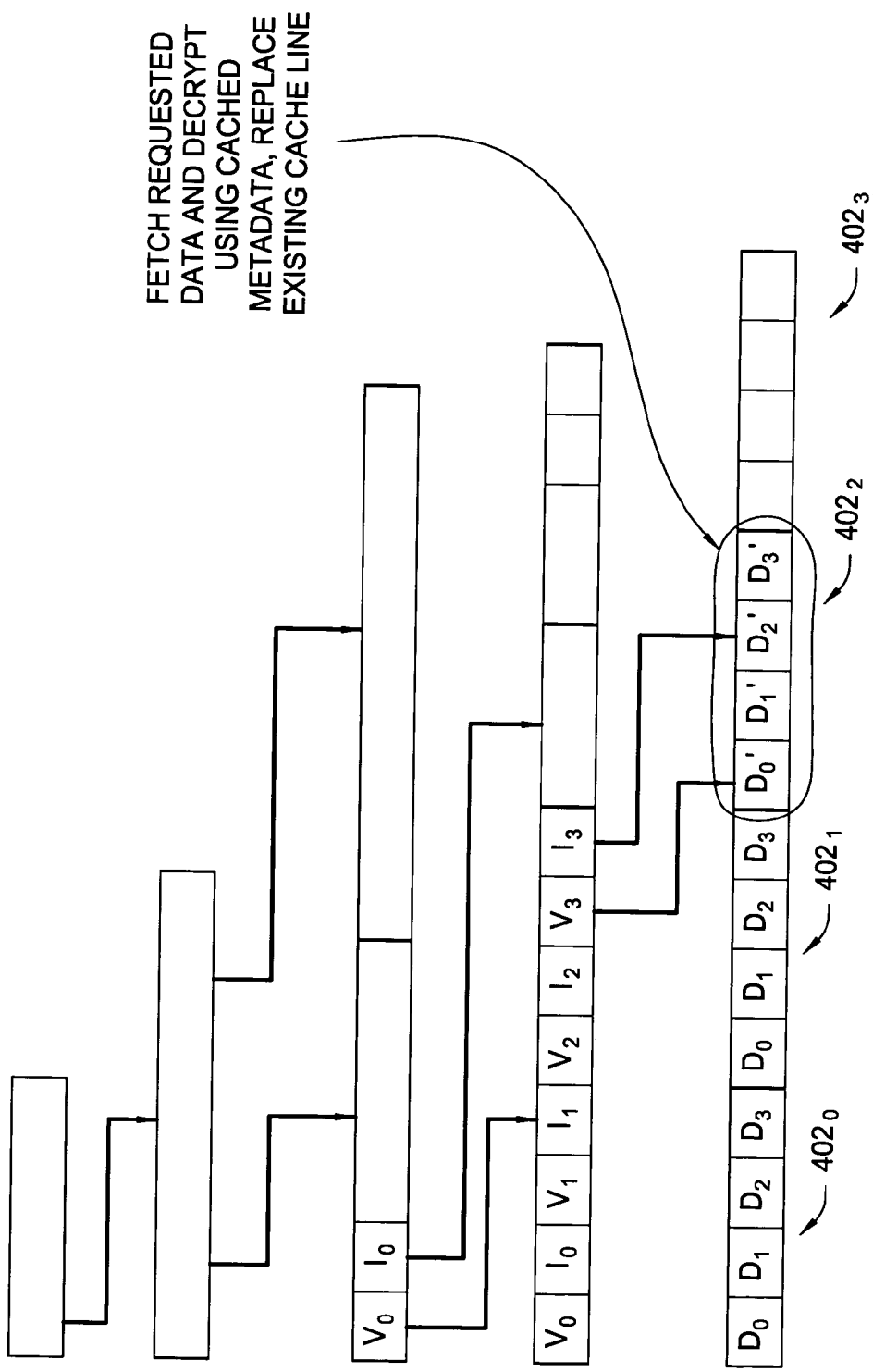

FIGS. 6A and 6B provide a simple illustration of processing a read request when the requested data is not cached, but the corresponding level 1 metadata is cached (e.g., the requested data is within the effective 1 kbytes of data covered by one of the level 1 metadata cache lines). As illustrated in FIG. 6A, a cache line $404_1$ containing various version and integrity pairs is contained in the first metadata level. While data cache lines $402_0$ and $402_1$ with corresponding level 1 metadata $V_0/I_1$ and $V_1/I_1$ are contained in the data level, a cache line containing the requested data is not. However, version and integrity values $V_2/I_2$ covering the requested data are contained in the first metadata level.

Therefore, as illustrated in FIG. 6B, a cache line $402_2$ containing the requested data (D0'-D3') may be retrieved, decrypted using the version value $V_2$, and validated using the integrity value $I_2$ (requiring a castout of the original contents D0-D3). Again, it should be noted that the cache line size used in the metadata cache may be greater than that used for the CPU cache. As a result, while only a portion of the data cache line $402_2$ (e.g., a single one of D0', D1', D2', or D3') may be forwarded to the CPU cache, if any of the other portions are subsequently requested, they may be retrieved from the metadata cache 160 without decryption (assuming such a request comes before the data cache line $402_2$ is cast out).

Regarding cast out of cache lines, for some embodiments, the metadata cache 160 may be operated in a write-back manner to combine multiple smaller bus write operations into a single modify-encrypt-write operation when a metadata cache line is cast out. In other words, modifications to secure data may be made locally, in the cache (marking the corresponding cache line as dirty in the tag RAM), and only written out to external memory when a cache line containing modified data (i.e., a "dirty" cache line) is cast out (e.g., to make room for another cache line to be read in). As a result, further reductions in encryption-related latency may be achieved by avoiding unnecessary intermediate encryption operations on data that is subsequently accessed and modified again while still cached.

Figure 7A:
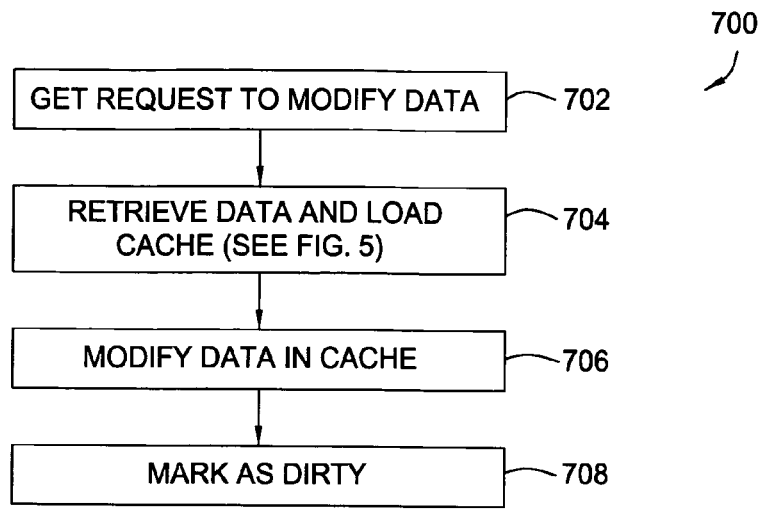
FIGS. 7A-7D are flow diagrams illustrating exemplary operations for modifying and writing back to memory (casting out) secure data, in accordance with embodiments of the present invention.

FIGS. 7A-7D are flow diagrams illustrating exemplary operations for modifying and writing back to memory (casting out) secure data, in accordance with embodiments of the present invention. Referring first to FIG. 7A, exemplary operations 700 for modifying secure data using the cache are shown. The operations 700 begin, at step 702, by receiving a request to modify data. Assuming the data is not already in the cache, at step 704, the requested data is retrieved and loaded into the cache (e.g., in accordance with the operations shown in FIG. 5). At step 706, the data is modified in the cache and, at step 708, the modified cache line is marked as dirty. In other words, rather than encrypt and write the modified data out to memory each time it is modified, as well as modifying the corresponding version number and calculating a new integrity value, the modifications may be maintained in cache until the cache line containing the modified data is to be cast out. As a result, multiple modifications may be locally, and maintained in the cache, until data has to be castout (e.g., to make room for new data). Referring back to FIG. 5, when new data is to be retrieved, a castout of currently cached data may be scheduled, as the metadata tree is "climbed" searching for valid metadata.

Figure 7B:
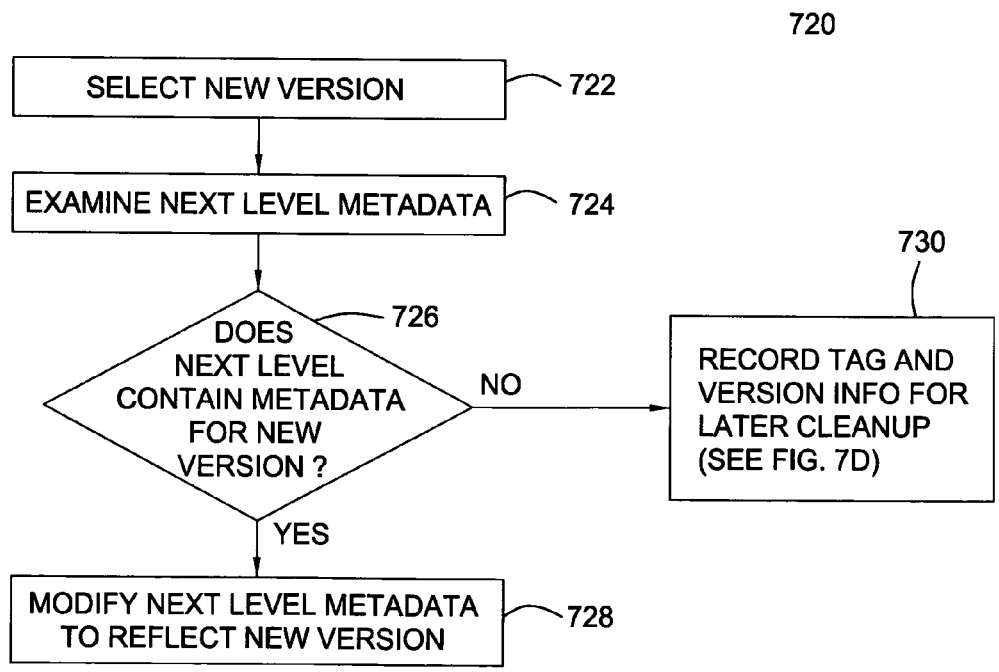

FIG. 7B illustrates exemplary operations 720 for scheduling a castout. In other words, the operations 720 may, in effect, be performed as part of a subroutine called from the operations performed in FIG. 5 to schedule castouts. The operations 720 begin, at step 722, by selecting a new version (for use in encrypting/decrypting the data to be castout). At step 724, the next higher metadata level is examined. If the next level metadata holds the metadata for the data to be castout, as determined at step 726, that metadata may be modified to reflect the new version, at step 728. If the next level metadata does not hold the metadata for the data to be castout. The tag and new version information may be recorded (e.g., in a cleanup list), at step 730, for use in later cleanup. Exemplary operations for cleaning up such cached entries are described below, with reference to FIG. 7D.

Figure 7C:
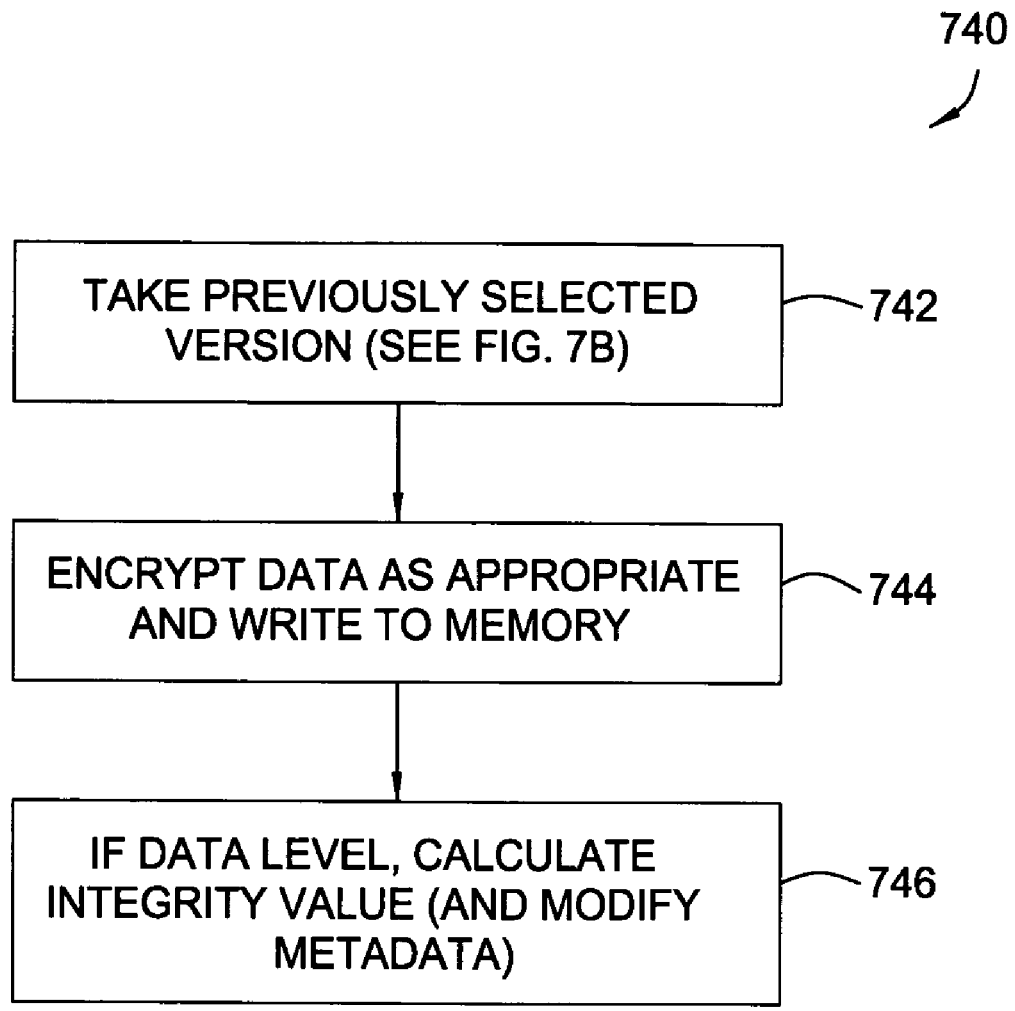

FIG. 7C illustrates exemplary operations 740 that may be used to process or handle pending (scheduled) castouts. The operations 740 may be performed to handle any scheduled castouts at each level, while working down the tree retrieving data (as shown in FIG. 5). The operations 740 begin, at step 742, by taking the previously selected version, using it to encrypt the data as appropriate, and write the data to memory, at step 744. If the data being castout is in the data level, an integrity check value may also be calculated, at step 746, and corresponding metadata (e.g., in the first metadata level) may be updated accordingly.

Figure 7D:
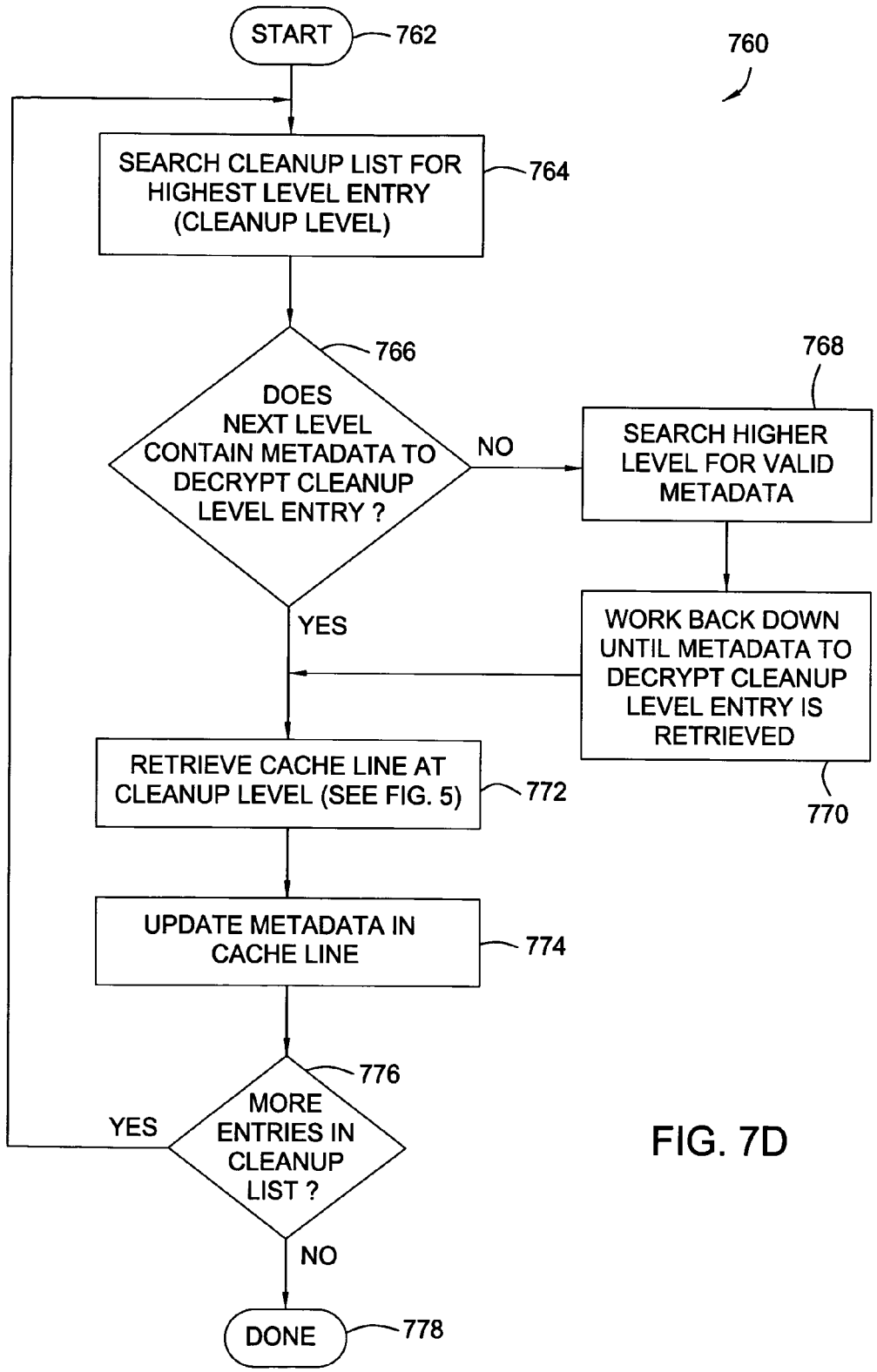

FIG. 7D illustrates exemplary operations 760 that may be used to process entries added to the cleanup list, when scheduling castouts in accordance with FIG. 7B. In other words, the operations 760 may be performed to process castouts for which metadata to be modified with new version information was not in the cache. This cleanup may be necessary to ensure that version information used to encrypt data being castout will be available for decryption when that data is retrieved. For some embodiments, the operations 760 may be performed as part of a background process to continually look for and process entries added to the cleanup list.

The operations 760 begin, at step 762 and, at step 764, the cleanup list is searched for the entry at the highest level (the cleanup level). The next higher level (from the cleanup level) is then examined, at step 766, to see if the metadata required to decrypt the data at the cleanup level is contained at that level. If so, the cache line for the cleanup level is retrieved using that metadata, at step 772.

On the other hand, if the metadata required to decrypt the data at the cleanup level is not contained in the next level of metadata, higher levels of the tree may be searched, at step 768. In other words, higher levels of metadata may be searched until valid metadata is found that may be used to retrieve metadata at lower levels (working back down the tree, at step 770) until the metadata required to decrypt the data at the cleanup level is found. For some embodiments, as an optimization, when working back down the tree, only the metadata needed to decrypt data at a lower level may be retrieved from memory (and not cached), rather than an entire (128 byte) cache line (thus possibly avoiding triggering higher level castouts). In any case, once the metadata needed to decrypt the data at the cleanup level is retrieved, the cache line at the cleanup level may be retrieved, at step 772.

Once the metadata at the cleanup level is retrieved, it may be updated, at step 774, to contain the new version information that was previously recorded (e.g., at step 730 of FIG. 7B). As long as there are more entries in the cleanup list, as determined at step 776, the cleanup operations may be repeated. It should also be noted that the cleanup operations themselves may have caused additional castouts to be scheduled (when retrieving cache lines, at step 722), possibly requiring further cleanup. It should also be noted that, in some cases, pending cleanups may prevent new data from being processed in the cache, to ensure metadata needed to decrypt secure data is not overwritten in the cache before it is stored in external memory. Once there are no more entries in the cleanup list, the operations are terminated, at step 778.

Figure 8B:
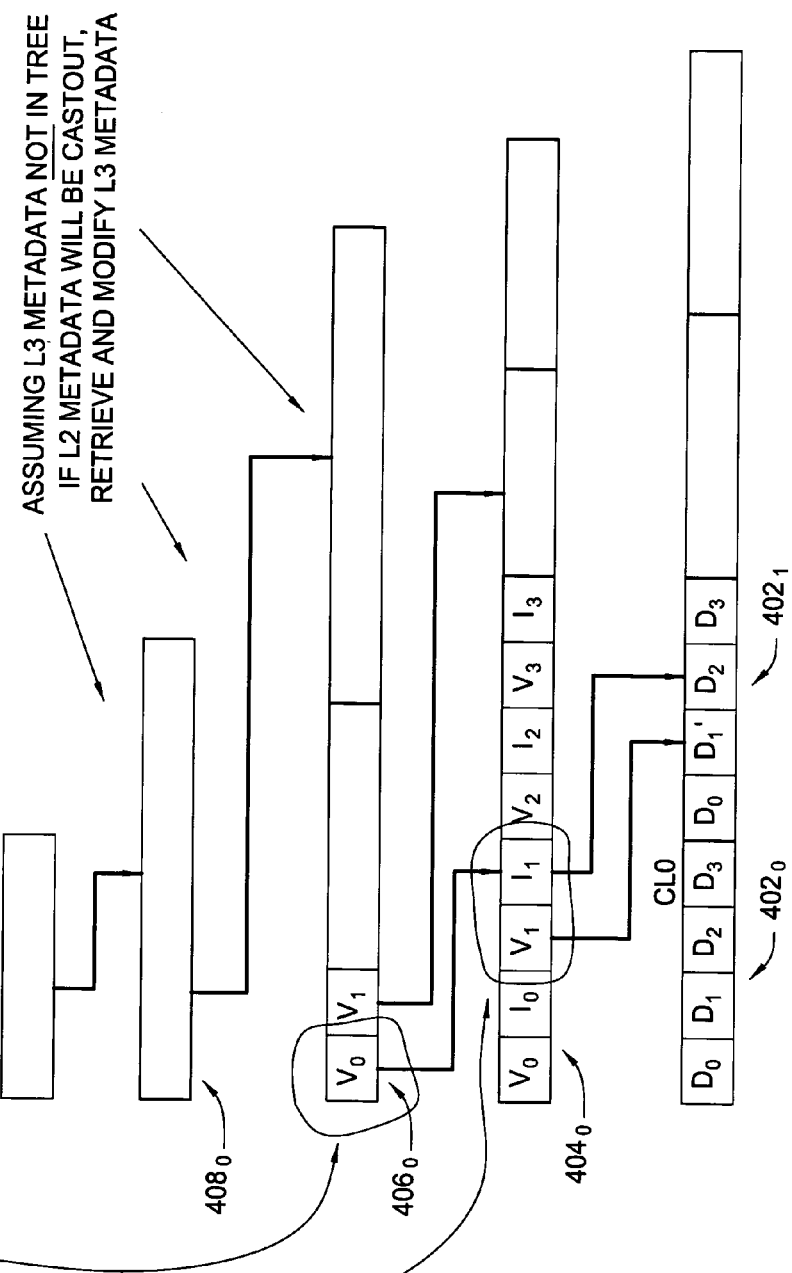

FIGS. 8A and 8B provide a simple illustration of updating secure data, utilizing the metadata cache in a write-back manner. Referring first to FIG. 8A, it is assumed that a cache line $402_1$ containing data D1 to be modified is contained in the metadata cache and that the data is modified (the modified data is labeled D1'). The corresponding version and integrity values $V_1/I_1$ are contained in a level 1 metadata cache line $404_0$.

As illustrated in FIG. 8B, upon cast-out of the cache line $402_1$, a new version value may be calculated (denoted $V_1'$) and a new integrity value may be calculated (denoted $I_1'$). The new version value $V_1'$ may then be used to encrypt the cache line $402_1$ before it is written out to external memory. If the level 1 metadata cache line $404_0$ is also to be cast out, a new level 2 version value ($V_0'$) used to encrypt the cache line $404_0$ prior to cast-out may also be calculated in a cache line $406_0$ contained in the second metadata level. As previously described, however, if the metadata (at any level) to be updated with a new version value for a cache line being castout is not already in the cache, the new version value and tag information for that cache line may be recorded for later cleanup (per operations of FIGS. 7B and 7D).

Various optimizations may be made to improve the performance of reading and/or modifying secure data utilizing the metadata cache. For example, rather than actually writing out cache lines to be cast out to external memory, they may be set aside to make room for cache lines being read in. For some embodiments, in an effort to allow cache lines to be read in quicker, each level in the authentication tree may be allocated sufficient storage to set aside a cache line and, possibly, the corresponding version values to be used for encryption. For some embodiments, a cache line to be cast out at each level may be encrypted and then set aside. In any case, in such embodiments, logic may be implemented to avoid conflicting reads, for example, a subsequent read of a cache line that has been modified and set-aside but has not yet been cast out (which may result in stale data being read in from external memory).

CONCLUSION

By utilizing a cache for externally stored security metadata used to encrypt and decrypt secure data (and, in some cases, the secure data itself), latency typically associated with the decryption processes may be significantly reduced. By operating the metadata cache in a write-back manner, additional resource consumption typically associated with the encryption process (e.g., accesses to external memory) may also be significantly reduced.

While the foregoing is directed to embodiments of the present invention, other and further embodiments of the invention may be devised without departing from the basic scope thereof, and the scope thereof is determined by the claims that follow.

What is claimed is:

1. A method of handling secure data in a secure system, wherein the secure data is passed between a processor and memory external to the processor, comprising:
   maintaining, in an encrypted form in the external memory, a set of metadata used to encrypt and decrypt the secure data;
   maintaining, in a decrypted form in a cache internal to the processor, a limited subset of the metadata;
   receiving a request to access a block of the secure data;
   retrieving the block of secure data from the external memory in encrypted form;
   determining whether a first portion of metadata needed to decrypt the block of secure data is in the cache;
   when the first portion of metadata is not in the cache:
   retrieving the first portion of metadata from the external memory;
   determining whether a second portion of metadata is in the cache; and
   when the second portion is not in the cache, retrieving the second portion of metadata from the external memory and decrypting the second portion of metadata using a third portion of metadata maintained in the cache;
   decrypting the first portion of metadata using the second portion of metadata in the cache; and
   decrypting the block of secure data using the first portion of metadata.

2. The method of claim 1, further comprising, when the first portion of metadata is in the cache:
   calculating an address corresponding to a location of the first portion of metadata in the external memory; and examining one or more tag ram entries for a match with the calculated address.

3. The method of claim 1, further comprising:
retrieving a portion of metadata from the external memory and decrypting the portion of metadata using metadata maintained in hardware on the processor.

4. The method of claim 1, further comprising:
validating the block of secure data by comparing an integrity value calculated on the secure block of data with an integrity value contained in the first portion of metadata.

5. The method of claim 4, further comprising:
placing a copy of the secure block of data in the cache; and
modifying the block of secure data in the cache without writing the block of secure data to the external memory until a cache line containing the block of secure data is cast out.

6. The method of claim 5, further comprising receiving a memory access request requiring the cache line containing the block of secure data to be cast out and, prior to casting the cache line out:
updating a security version value contained in the first portion of metadata;
updating an integrity value contained in the first portion of data based on the modified block of secure data;
encrypting the modified block of secure data using the updated security version value; and
writing the modified block of secure data to the external memory in encrypted form.

7. A method of handling secure data in a secure system, wherein the secure data is passed between a processor and memory external to the processor, comprising:
maintaining, in the external memory in an encrypted form, an authentication tree containing a first level of metadata comprising security version values for use in encrypting blocks of secure data and integrity values for use in authenticating blocks of secure data encrypted using the security version values and at least a second level containing security version values for use in encrypting portions of the first level of metadata;
maintaining, in external memory, blocks of secure data encrypted using the security version values contained in the first level of metadata;
maintaining, in a decrypted form in a cache internal to the processor, a limited subset of the authentication tree spanning multiple levels;
maintaining blocks of secure data in the cache; and
modifying a block of secure data in the cache without writing the block of secure data to the external memory until a cache line containing the block of secure data is cast out.

8. The method of claim 7, wherein modifying the block of secure data in the cache comprises modifying the block of secure data multiple times before writing the block of secure data to the external memory.

9. The method of claim 7, further comprising:
receiving a request to access secure data;
determining whether the requested secure data is contained in the cache; and when the requested secure data is contained in the cache, returning the secure data from the cache without accessing the external memory.

10. The method of claim 9, further comprising, when the requested secure data is not contained in the cache:
determining whether first metadata required to decrypt a block of secure data containing the requested data is contained in the first level of metadata maintained in the cache; and
when the first level metadata is maintained in the cache, retrieving the block of secure data containing the requested data and decrypting the block of secure data using the first level metadata.

11. The method of claim 10, further comprising when first metadata required to decrypt a block of secure data containing the requested data is not contained in the first level of metadata maintained in the cache:
determining whether second metadata required to decrypt a block of data containing the first metadata is contained in a second level of metadata maintained in the cache; and
when the second metadata is maintained in the cache, retrieving the block of data containing the first metadata and decrypting the block of data containing the first metadata using the second metadata.

12. The method of claim 10, further comprising initiating a read of the secure block of data prior to completion of decrypting the block of data containing the first metadata.

13. The method of claim 7, further comprising:
modifying at least one of data or metadata maintained in the cache without writing blocks of data containing the modified data or metadata to external memory until cache lines containing the blocks of modified data or metadata are cast out.

14. A method of handling secure data in a secure system, wherein the secure data is passed between a processor and memory external to the processor, comprising:
maintaining, in an encrypted form in the external memory, a set of metadata used to encrypt and decrypt the secure data;
maintaining, in a decrypted form in a cache internal to the processor, a limited subset of the metadata;
receiving a request to access a block of the secure data;
retrieving the block of secure data from the external memory in encrypted form;
determining when a first portion of metadata needed to decrypt the block of secure data is in the cache;
when the first portion of metadata is not in the cache:
retrieving the first portion of metadata from the external memory;
determining whether a second portion of metadata is in the cache; and
when the second portion is not in the cache, retrieving the second portion of metadata from the external memory and decrypting the second portion of metadata using a third portion of metadata maintained in the cache;
decrypting the first portion of metadata using the second portion of metadata; and
decrypting the block of secure data using the first portion of metadata in the cache, wherein:
(i) the first portion of metadata comprises one or more security version values used to affect encryption of secure data and one or more integrity values used to authenticate secure data encrypted using the one or more security version values; and
(ii) the second portion of metadata comprises one or more security version values used to affect encryption of the first portion of metadata.

* * * * *

UNITED STATES PATENT AND TRADEMARK OFFICE
CERTIFICATE OF CORRECTION

PATENT NO. : 7,657,756 B2 Page 1 of 1
APPLICATION NO. : 10/961743
DATED : February 2, 2010
INVENTOR(S) : William E. Hall It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1517 days.

Signed and Sealed this

Thirtieth Day of November, 2010

David J. Kappos
*Director of the United States Patent and Trademark Office*